US008506412B2

(12) United States Patent
Powell et al.

(10) Patent No.: US 8,506,412 B2
(45) Date of Patent: Aug. 13, 2013

(54) METHODS AND SYSTEMS FOR WIRELESS COMMUNICATION WITHIN A GAMING MACHINE

(75) Inventors: Gene Elvin Powell, Reno, NV (US); Mark Woodard, Reno, NV (US)

(73) Assignee: IGT, Reno, NV (US)

( * ) Notice: Subject to any disclaimer, the term of this patent is extended or adjusted under 35 U.S.C. 154(b) by 841 days.

(21) Appl. No.: 12/269,133

(22) Filed: Nov. 12, 2008

(65) Prior Publication Data

US 2010/0117544 A1 May 13, 2010

(51) Int. Cl.
*A63F 13/08* (2006.01)
*H05B 41/18* (2006.01)

(52) U.S. Cl.
USPC .................. 463/46; 463/24; 463/47; 315/362

(58) Field of Classification Search
USPC .................... 463/46, 24, 1, 47; 315/152, 362
See application file for complete search history.

(56) References Cited

U.S. PATENT DOCUMENTS 4,668,895 A 5/1987 Schneiter
5,621,384 A 4/1997 Crimmins et al.
5,982,519 A 11/1999 Martnelli et al.
6,782,245 B1 8/2004 Lazzarotto et al.
7,014,336 B1 3/2006 Ducharme et al.
7,202,613 B2 4/2007 Morgan et al.
7,228,074 B2 6/2007 Devine, III et al.
7,253,566 B2 8/2007 Lys et al.
7,280,975 B1 10/2007 Donner
7,309,965 B2 12/2007 Dowling et al.
7,348,949 B2 3/2008 Lee et al.
7,862,435 B1 * 1/2011 Schreiber ........................ 463/46
2003/0057886 A1 3/2003 Lys et al.
2004/0082385 A1 4/2004 Silva et al.
2007/0242834 A1 10/2007 Coutinho et al.
2008/0026854 A1 1/2008 Chen et al.

* cited by examiner

*Primary Examiner* — Damon Pierce

(74) *Attorney, Agent, or Firm* — Griffiths & Seaton PLLC

(57) ABSTRACT

A gaming machine includes a main door coupled to a main cabinet and a controller positioned within the main cabinet, wherein the controller includes a wireless transmitter configured to transmit wireless control signals. The gaming machine also includes a display board coupled to the main door, wherein the display board includes a plurality of light devices and a wireless receiver configured to receive the wireless signals from the wireless transmitter, and wherein the wireless signals are representative of control commands for the plurality of light devices.

16 Claims, 4 Drawing Sheets

METHODS AND SYSTEMS FOR WIRELESS COMMUNICATION WITHIN A GAMING MACHINE

BACKGROUND OF THE INVENTION

The subject matter described herein relates generally to wireless communications and, more particularly, to methods and systems for controlling a light emitting diode (LED) display within a gaming machine using infrared (IR) communications.

At least some known gaming machines use standard peripheral component interconnect (PCI) connections between a controller and an LED lighting display that is part of a light circuit board used to display graphics to players. Because of space constraints, often within such gaming machines, the light circuit board is coupled to an access door of the gaming machine such that, when the access door is closed, the light circuit board may physically contact the controller or other electronics within the gaming machine. Such gaming machines often couple a cushion, such as a soft foam cushion, to the light circuit board to protect the controller, the light circuit board, and/or the connecting wires. More specifically, the cushion protects the light circuit board and/or other electronics within the gaming machine from impact forces induced when the access door is closed. Moreover, the cushion facilitates decreasing an amount of force that may be applied to other internal electronics by the light circuit board due to gravity, vibrational forces, and/or other external forces. However, over time, known cushions may break down and/or lose their effectiveness and may provide only limited vibration damping and limited protection.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a gaming machine is provided. The gaming machine includes a main door coupled to a main cabinet, and a controller positioned within the main cabinet, wherein the controller includes a wireless transmitter configured to transmit wireless control signals. The gaming machine also includes a display board coupled to the main door. The display board includes a plurality of light devices and a wireless receiver configured to receive the wireless signals from the wireless transmitter, wherein the wireless signals are representative of control commands for the plurality of light devices.

In another aspect, a method is provided for operating a gaming machine display. The method includes transmitting a control signal from a wireless transmitter coupled to a gaming machine controller to a wireless receiver coupled to a display board, wherein the display board is coupled to a main door of the gaming machine. The method also includes controlling operation of a plurality of light devices of the display board based on the control signal received by the wireless receiver.

In another aspect, a wireless communication system is provided for use with a gaming machine. The system includes a controller that includes a wireless transmitter configured to transmit control signals using a wireless protocol, and a display board coupled to a main door of the gaming machine. The display board includes a plurality of light devices, a wireless receiver configured to receive control signals, and a processor coupled to the plurality of light devices and the wireless receiver. The processor is configured to control the plurality of light devices based on the control signals.

BRIEF DESCRIPTION OF THE DRAWINGS

The embodiments described herein may be better understood by referring to the following description in conjunction with the accompanying drawings.

DETAILED DESCRIPTION OF THE INVENTION

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Technical effects of methods, systems, and apparatus described herein include at least one of (a) encoding a display command for use by a gaming machine, thereby forming a control signal; (b) transmitting the control signal, by a wireless transmitter, to a wireless receiver coupled that is included in a display circuit coupled to a main door of the gaming machine; (c) decoding the control signal to obtain the original display command; (d) based on the decoded display command, controlling a plurality of light devices included in the display circuit, wherein the display command relates to one or more of on/off pulses, a color or color combination to be displayed to a player of the gaming machine from within red, blue, and/or green color spectrums, and a symbol or symbol combination to be displayed to the player in relation to game play; and (e) powering off the plurality of light devices due to a loss of communication between the wireless transmitter and the wireless receiver when the main door of the gaming machine is opened.

Various embodiments of the invention described herein use a wireless transmission protocol to communicate control signals from a wireless transmitter coupled to a gaming machine controller to a wireless receiver of a display circuit coupled to a main door of the gaming machine. Examples of such wireless transmission protocols include, but are not limited to only including, infrared (IR) light, Bluetooth®, and ZigBee® (Bluetooth® is a registered trademark of Bluetooth SIG, Inc., Bellevue, Wash., USA, and ZigBee® is a registered trademark of ZigBee Alliance Corporation, San Ramon, Calif., USA). However, one of ordinary skill in the art will appreciate that any other suitable wireless transmission protocol may be used in the embodiments described below.

Figure 1:
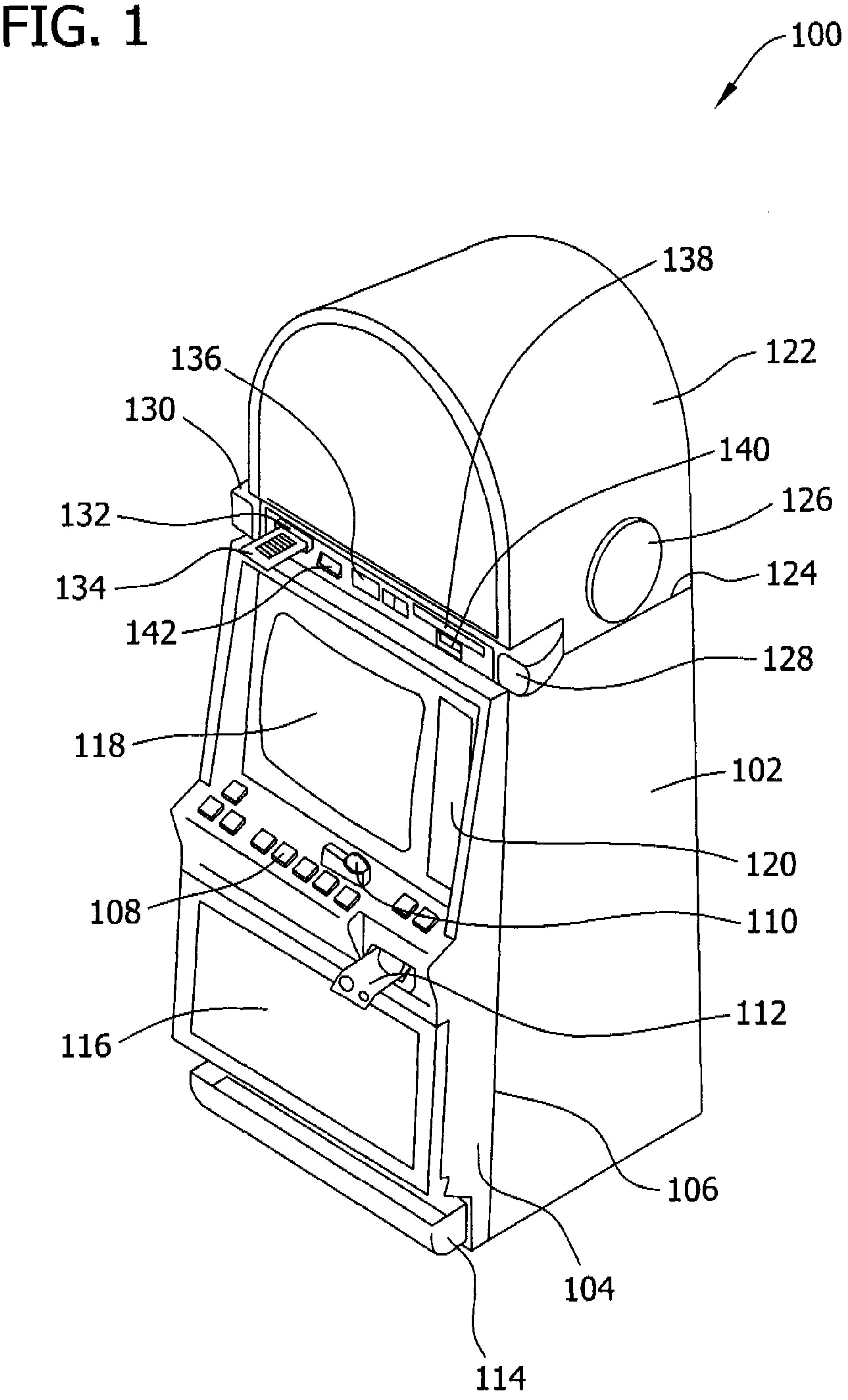
FIG. 1 is a schematic diagram of an exemplary gaming machine.

FIG. 1 is a schematic diagram of an exemplary gaming machine 100 that includes a wireless communication circuit (not shown in FIG. 1) for use in controlling a plurality of light devices (not shown in FIG. 1). Gaming machine 100 may be any type of gaming machine, and may include different structures than those shown in FIG. 1. Moreover, gaming machine 100 may use different methods of operation than those described below.

In the exemplary embodiment, gaming machine 100 includes a main cabinet 102 that includes a main door 104 coupled to a front 106 of gaming machine 100 via a hinge (not shown). When opened, door 104 provides access to an interior (not shown) of gaming machine 100. In the exemplary embodiment, a plurality of player-input switches and/or buttons 108 are coupled to main door 104. Moreover, in the exemplary embodiment, a coin acceptor 110, for accepting coins and/or tokens, a bill acceptor 112, for accepting and/or validating cash bills, a coin tray 114, for collecting a coin-based payout, and a belly glass 116 are each coupled to main door 104. A video display 118 and an information panel 120 are viewable through main door 104. In the exemplary embodiment, video display 118 is implemented via a plurality of lighting devices (not shown in FIG. 1), such as a light emitting diode (LED) lighting display. However, in alternative embodiments, video display 118 may be implemented as a cathode ray tube (CRT), a flat-panel liquid crystal display (LCD), a plasma display, an organic light-emitting diode (OLED) display, and/or any other electronically-controlled video display that incorporates a plurality of light devices. Moreover, video display 118 may include touch screen capabilities. In the exemplary embodiment, information panel 120 is a back-lit, silk screened glass panel that includes lettering indicative of general game information including, for example, a number of coins wagered. Coin acceptor 110, bill acceptor 112, player-input buttons 108, video display 118, and information panel 120 are each used by a player to play a game on gaming machine 100. Each component 108, 110, 112, 118, and/or 120 is controlled by a gaming machine controller (not shown in FIG. 1) that is housed inside main cabinet 102. Numerous games including, but not limited to only including, video slot games, video poker, video pachinko, video black jack, video card games, and/or video keno may be implemented for play on gaming machine 100.

In the exemplary embodiment, gaming machine 100 also includes a top box 122 that is positioned on a top surface 124 of main cabinet 102. In the exemplary embodiment, top box 122 includes a number of devices that may be used to add features to a game being played on gaming machine 100. Such devices may include, but are not limited to only including, speakers 126, 128, and 130, a ticket printer 132 for printing bar-coded tickets 134, a key pad 136 for entering player tracking information, or player preferences or characteristics, a florescent display 138 for displaying player tracking information and/or player preferences or characteristics, and a card reader 140 for receiving a magnetic striped card containing player tracking information and/or player preferences or characteristics encoded thereon. Card reader 140 may also be used to accept coupons, credit cards, printed cards, smart cards, and/or ticket vouchers. Moreover, top box 122 may house additional devices not shown in FIG. 1, such as, for example, a bonus wheel, a secondary video display, and/or a back-lit silk screened panel that may be used to add bonus features to a game being played on gaming machine 100. During game play, such devices may be controlled by circuitry, such as the gaming machine controller housed within main cabinet 102.

Figure 2:
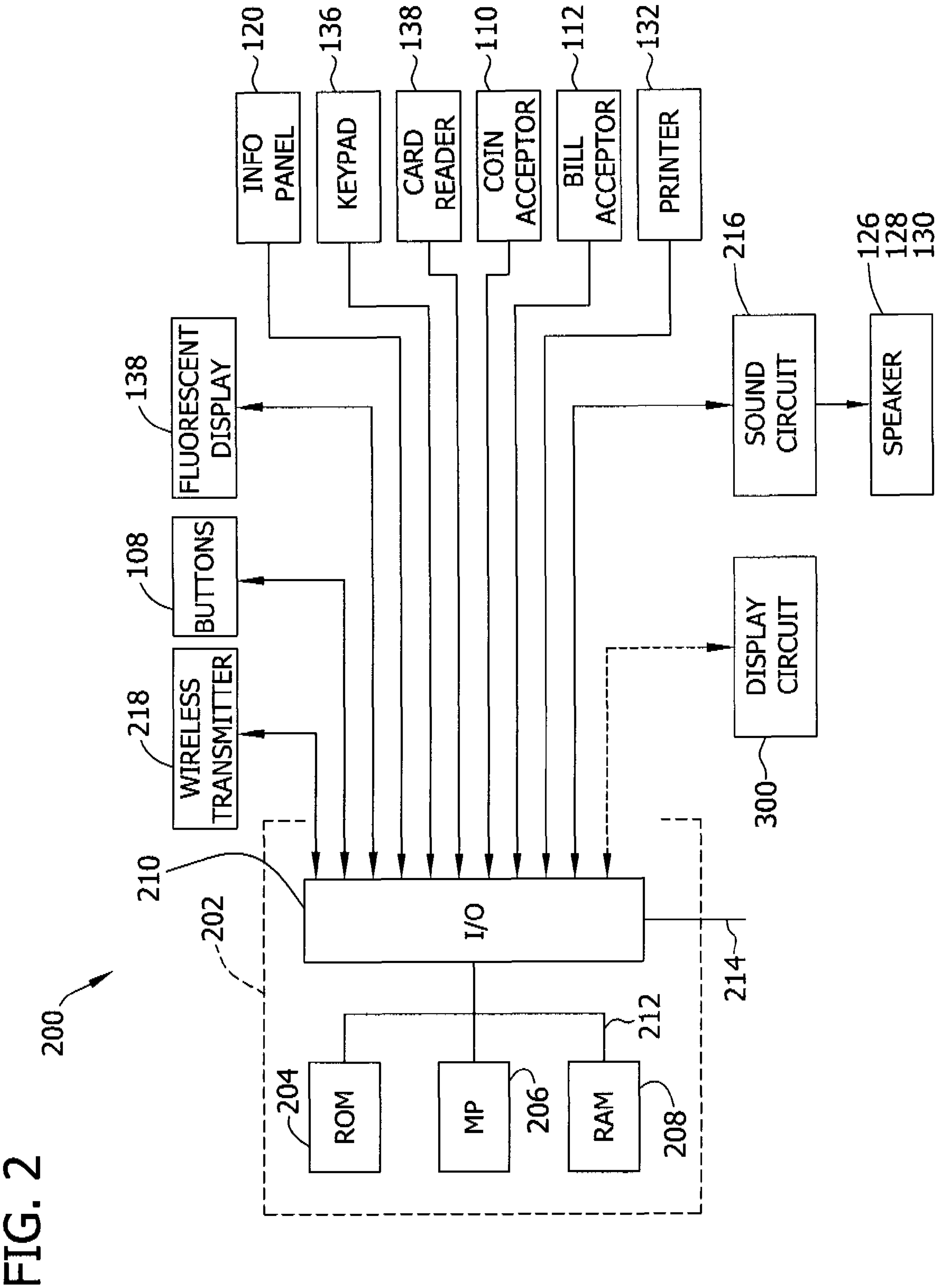
FIG. 2 is a block circuit diagram of an exemplary electrical architecture that may be used with the gaming machine shown in FIG. 1.

FIG. 2 is a block circuit diagram of an exemplary electrical architecture 200 incorporated into an exemplary gaming machine, such as gaming machine 100. In the exemplary embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, that are each coupled via an address/data bus 212. As used herein, the terms "controller" and "processor" may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms "controller" or "processor". Alternative embodiments of controller 202 may include more than one microprocessor 206, multiple RAM modules 208, and/or multiple ROM modules 204. Moreover, although I/O circuit 210 is shown in FIG. 2 as a single component, one of ordinary skill in the art should appreciate that I/O circuit 210 may include any number or a plurality of different types of I/O circuits. Furthermore, RAM 208 and/or ROM 204 may be implemented as, for example, semiconductor memories, magnetically readable memories, and/or optically readable memories. In one embodiment, each operational component of gaming machine 100 is coupled to I/O circuit 210 via a respective conductor. Alternative embodiments may include only a single coupling between the operational components of gaming machine 100 and I/O circuit 210. In the exemplary embodiment, I/O circuit 210 is coupled to a gaming network (not shown) via a network interface 214. Moreover, in the exemplary embodiment, architecture 200 includes a sound circuit 216 that generates audio signals and that communicates audio signals between I/O circuit 210 and speakers 126, 128, and/or 130. In the exemplary embodiment, architecture 200 also includes a wireless transmitter 218 that receives display control signals from controller 202 and that transmits control signals to a display circuit 300 using a wireless protocol. More specifically, controller 202 encodes a display command to form a display control signal and transmits the display control signal to wireless transmitter 218. Wireless transmitter 218 then transmits the display control signal using a wireless protocol. In the exemplary embodiment, wireless transmitter 218 is an infrared (IR) transmitter. Alternative embodiments may implement wireless transmitter 218 as, for example and not by way of limitation, a Bluetooth transmitter, a ZigBee transmitter, or a wireless transmitter using any other suitable wireless transmission protocol.

Figure 3:
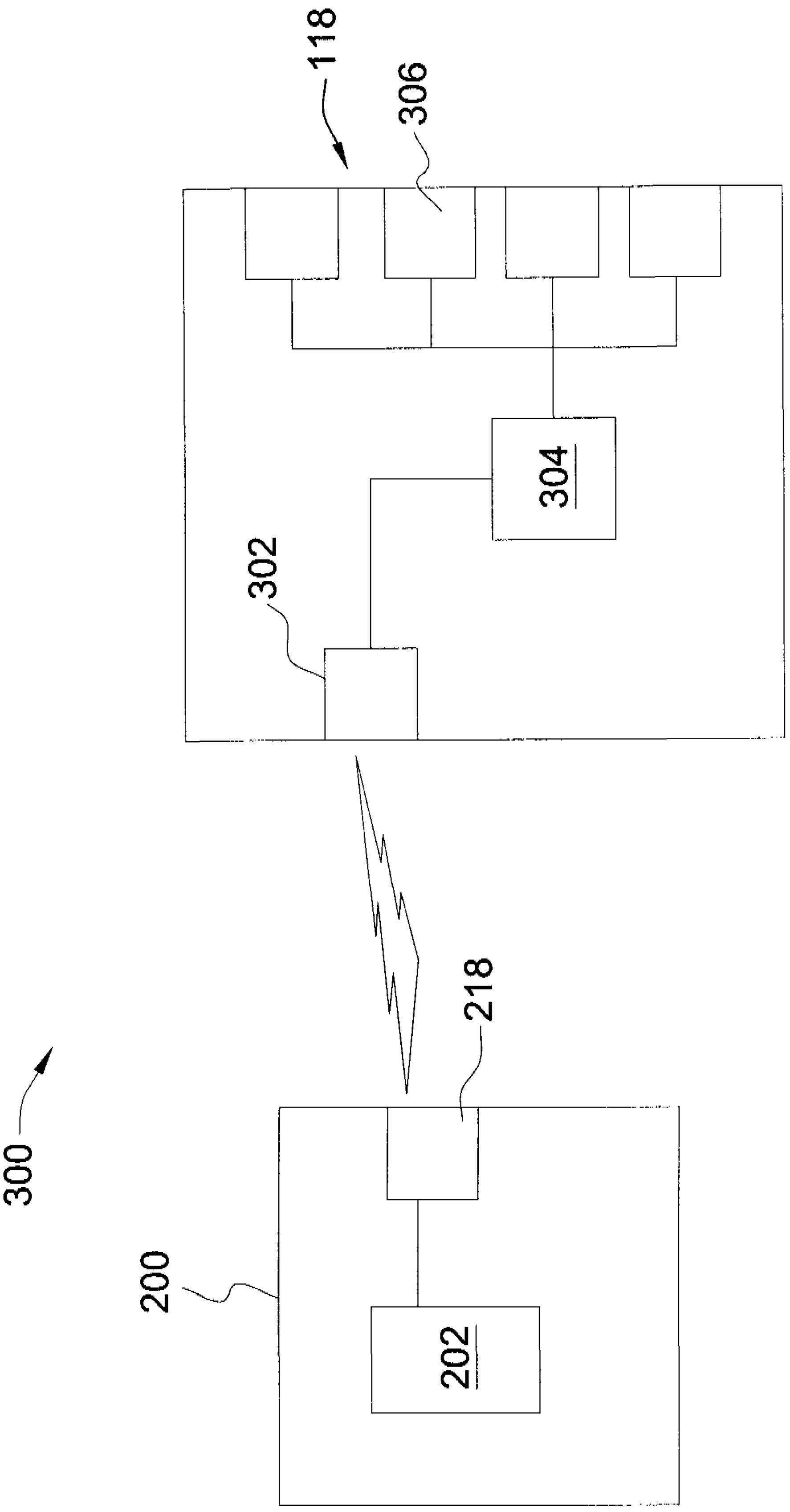
FIG. 3 is a block circuit diagram of an exemplary wireless communication circuit that may be used with the electrical architecture shown in FIG. 2.

FIG. 3 is a block circuit diagram of an exemplary display circuit, such as display circuit 300. In the exemplary embodiment, display circuit 300 is coupled to a piece of plastic material (not shown) that is configured to a display pattern and defines a centered hole that facilitates displaying game-related symbols therethrough. A layer of glass (not shown) is positioned between the piece of plastic material and main door 104 (shown in FIG. 1). In the exemplary embodiment, display circuit 300 receives power via power cables (not shown) that extend through a hinge (not shown) coupling main door 104 to main cabinet 102 (shown in FIG. 1). Moreover, in the exemplary embodiment, display circuit 300 includes a wireless receiver 302, a processor 304, and a plurality of light devices 306, such as a plurality of LED devices. Wireless receiver 302 receives display control signals transmitted by wireless transmitter 218, and then transmits control signals to processor 304. Processor 304 controls light devices 306 within video display 118 based on control signals received. More specifically, wireless receiver 302 receives display control signals from wireless transmitter 218 and transmits such display control signals to processor 304. Processor 304 decodes the display control signals to determine each display command issued by controller 202. Processor 304 also controls light devices 304 based on the display command. In the exemplary embodiment, wireless receiver 302 is an infrared (IR) receiver. Alternative embodiments may implement wireless receiver 302 as, for example and not by way of limitation, a Bluetooth receiver, a ZigBee receiver, or a wireless receiver configured to receive signals via any other suitable wireless transmission protocol. Moreover, in the exemplary embodiment, communication between wireless transmitter 218 and wireless receiver 302 is an example of one-way communication, such that each display control signal travels only from wireless transmitter 218 to wireless receiver 302 and does not travel from wireless receiver 302 to wireless transmitter 218. Alternative embodiments, however, may use two wireless transceivers capable of communicating a display control signal from controller 202 to display circuit 300 and/or messages, such as display status messages, from display circuit 300 to controller 202 via the wireless transceivers.

In the exemplary embodiment, display commands are transmitted as display control signals to display circuit 300 to facilitate controlling display of game-related elements, such as video slot machine indicia, video poker cards, and the like. As such, light devices 306 are not maintained in a constant "on" position. Rather, controller 202 and processor 304 control light devices 306 as defined by software that is executed via gaming machine 100 (shown in FIG. 1) and, more specifically, by controller 202. Specifically, display commands issued by controller 202 as encoded display control signals are transmitted to wireless receiver 302 and decoded by processor 304 to facilitate controlling light devices 306 during such game activities as attraction sequences, primary game play, award sequences, bonus game play, and the like. More specifically, based on the display commands, processor 304 controls light devices 306 via on/off pulses that activate and/deactivate light devices 306, respectively. Moreover, processor 304 controls the colors displayed to a player of gaming machine 100 via light devices 306 using combinations of color ranges in the red, blue, and green spectrums. Furthermore, processor 304 controls patterns or indicia displayed to a player of gaming machine 100 via light devices 306. In the exemplary embodiment, when main door 104 is opened, communication between wireless transmitter 218 and wireless receiver 302 is interrupted, which results in light devices 306 being powered down. As such, in the exemplary embodiment, a power down of light devices 306 is not due to a loss of electrical power but, rather, is as a result of an interruption in communication between wireless transmitter 218 and wireless receiver 302.

Figure 4:
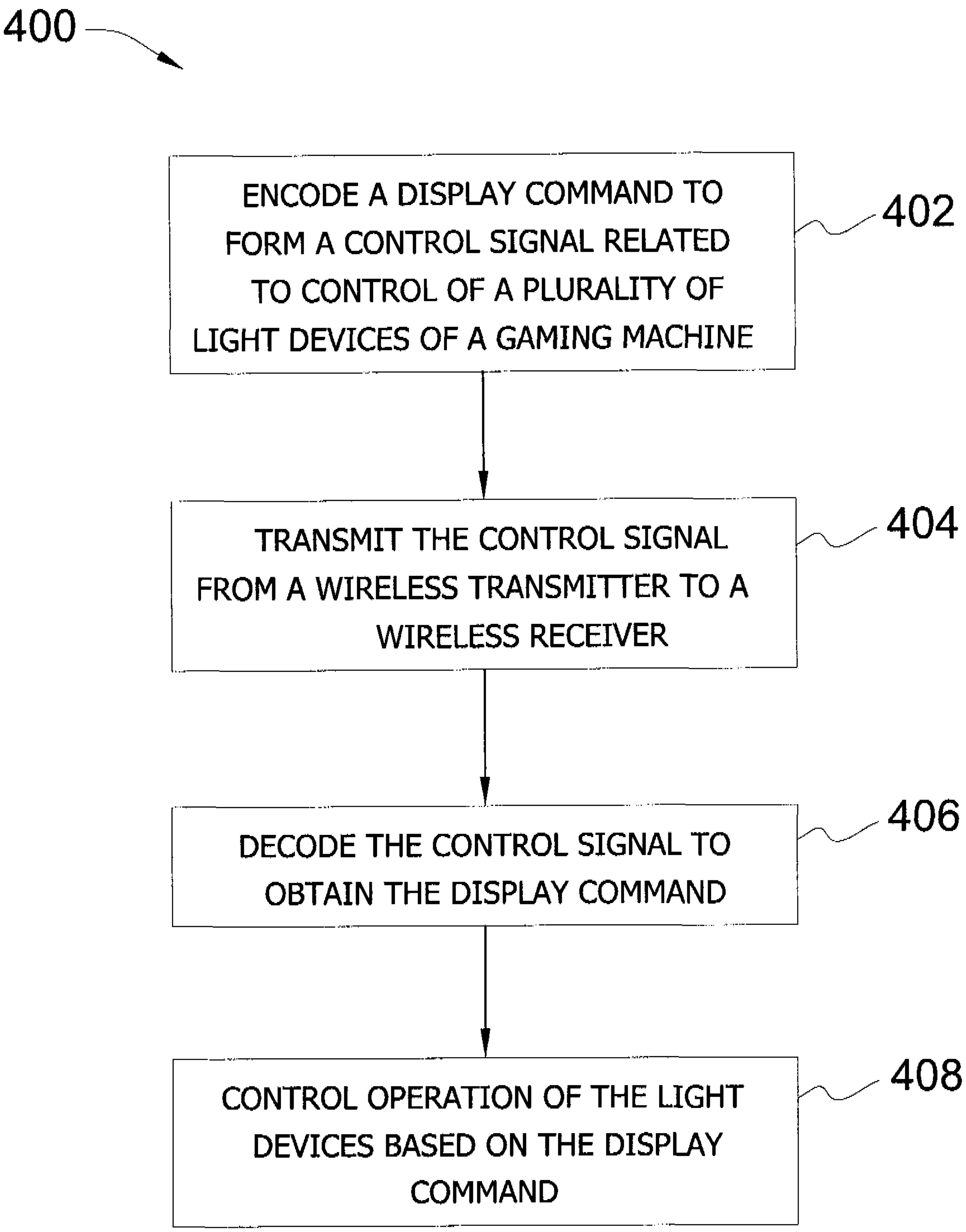
FIG. 4 is a flowchart illustrating an exemplary method for adjusting display settings of a gaming machine.

FIG. 4 is a flowchart illustrating an exemplary method 400 for adjusting the display settings of a gaming machine, such as gaming machine 100 (shown in FIG. 1). Referring also to FIGS. 1-3, in the exemplary embodiment, a display command is encoded 402 to form a control signal related to control of a plurality of light devices within a gaming machine, such as light devices 306. Specifically, controller 202 encodes a display command to form the control signal. Controller 202 then transmits the control signal to wireless transmitter 218.

Moreover, in the exemplary embodiment, wireless transmitter 218 transmits control signals to light circuit 300. Specifically, wireless transmitter 218 transmits 404 control signals to wireless receiver 302. Wireless receiver 302 receives control signals and transmits control signals to processor 304. In the exemplary embodiment, processor 304 then decodes 406 the control signals to obtain the display command. Based on the display command, processor 304 controls 408 operation of light devices 306. Specifically, processor 304 controls operation of light devices 306 during game activities, such as attraction sequences, primary game play, award sequences, bonus game play, and the like. More specifically, based on the display command, processor 304 controls light devices 306 via on/off pulses that activate and/deactivate light devices 306, respectively. Moreover, processor 304 controls the colors displayed to a player of gaming machine 100 via light devices 306 using combinations of color ranges in the red, blue, and green spectrums. Furthermore, processor 304 controls patterns or indicia displayed to a player of gaming machine 100 via light devices 306. In the exemplary embodiment, when main door 104 is opened, communication between wireless transmitter 218 and wireless receiver 302 is interrupted, which results in light devices 306 being powered down. As such, in the exemplary embodiment, a power down of light devices 306 is not due to a loss of electrical power but, rather, is as a result of an interruption in communication between wireless transmitter 218 and wireless receiver 302.

The systems, methods, and apparatus described herein facilitate use of less wiring within a gaming machine. Requiring less wiring within a gaming machine facilitates decreasing an amount of pressure induced to a display board that includes light devices configured to display game-related indicia and/or symbols to a player. Reducing the pressure on the display board facilitates reducing an amount of needed maintenance and/or troubleshooting, which facilitates reducing a cost of maintenance and/or lengthens a usable life of the display board.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Exemplary embodiments of systems, methods, and apparatus for controlling a gaming machine display are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:

a main door coupled to a main cabinet;

a controller positioned within an interior of said main cabinet, said controller comprising an infrared transmitter configured to transmit infrared control signals; and a display board coupled to said main door within the interior of said main cabinet, said display board comprising a plurality of light devices and an infrared receiver configured to receive the infrared signals from said infrared transmitter, wherein the infrared signals are representative of control commands for said plurality of light devices, wherein opening the main door interrupts communications between the infrared transmitter and the infrared receiver, the lighting devices powering down in response to the interrupt in communications.

2. A gaming machine in accordance with claim 1, wherein said display board further comprises a processor coupled to said infrared receiver and to said plurality of light devices, said processor controls said plurality of light devices based on infrared signals received by said infrared receiver.

3. A gaming machine in accordance with claim 2, wherein said controller is configured to encode infrared signals, said infrared transmitter is configured to transmit encoded infrared signals, said infrared receiver is configured to receive encoded infrared signals and transmit encoded infrared signals to said processor, said processor is configured to decode encoded infrared signals.

4. A gaming machine in accordance with claim 1, wherein the infrared signals include at least one of on/off pulses for activating said plurality of light devices, a color combination for display to a player of said gaming machine by said plurality of light devices, and a pattern for display to the player by said plurality of light devices.

5. A gaming machine in accordance with claim 1, wherein said plurality of light devices comprise a plurality of light emitting diodes (LED).

6. A gaming machine in accordance with claim 1, wherein said display board is configured to receive power through a hinge that couples said main door to said main cabinet.

7. A method of operating a gaming machine display, said method comprising:

transmitting a control signal from an infrared transmitter coupled to a gaming machine controller to an infrared receiver coupled to a display board, wherein the display board is coupled to a main door of the gaming machine;

controlling operation of a plurality of light devices of the display board based on the control signal received by the infrared receiver; and interrupting communication between the infrared transmitter and the infrared receiver by opening the main door wherein the plurality of light devices power off in response to the interrupt in communication.

8. A method in accordance claim 7, further comprising encoding the control signal by the gaming machine controller and transmitting the encoded signal from the gaming machine controller to the infrared transmitter.

9. A method in accordance with claim 8, wherein the display board includes a processor coupled to the infrared receiver and the plurality of light devices, said method further comprising:

receiving the encoded control signal;

transmitting the control signal from the infrared receiver to the processor; and decoding the control signal.

10. A method in accordance with claim 7, wherein controlling operation of the plurality of light devices comprises at least one of activating the plurality of light devices, deactivating the plurality of light devices, displaying a color combination to a player of the gaming machine via the plurality of light devices, and displaying a pattern to the player via the plurality of light devices.

11. An infrared communication system for use with a gaming machine, said system comprising:

a controller comprising an infrared transmitter configured to direct infrared control signals toward an infrared receiver; and a display board coupled to a main door of the gaming machine, said display board comprising a plurality of light devices, the infrared receiver configured to receive infrared control signals directed towards the receiver from the infrared transmitter, and a processor coupled to said plurality of light devices and said infrared receiver, wherein said processor is configured to control said plurality of light devices based on the control wherein opening the main door interrupts communication between the infrared transmitter and the infrared receiver, the plurality of light devices powering off in response to the interrupt in communications.

12. An infrared communication system in accordance with claim 11, wherein said plurality of light devices comprise a plurality of light emitting diodes (LED).

13. A gaming machine comprising:

a main door coupled to a main cabinet;

a controller positioned within an interior of said main cabinet, said controller comprising a first portion of a communications channel configured to at least transmit information;

a display board coupled to said main door within the interior of said main cabinet, said display board comprising a plurality of light devices; and a second portion of a communications channel associated with the main door, and communicatively coupled to the display board, the second portion of the communications channel configured to at least receive information from the first portion of the communications channel, wherein opening the main door interrupts communications between the first portion of the communications channel and the second portion of the communications channel, the lighting devices powering down in response to the interrupt in communications.

14. A gaming machine in accordance with claim 13, wherein the first portion of the communications channel is configured to transmit and receive information.

15. A gaming machine in accordance with claim 13, wherein the second portion of the communications channel is configured to transmit and receive information.

16. A gaming machine in accordance with claim 13, wherein the information transmitted by the first portion of the communications channel and received by the second portion of the communications channel includes control signals for the display board.

* * * * *